United States Patent
Ogata et al.

(10) Patent No.: US 6,832,146 B2
(45) Date of Patent: Dec. 14, 2004

(54) ACTIVATING APPARATUS FOR VEHICLE PASSENGER PROTECTION DEVICES

(75) Inventors: Yoshihisa Ogata, Chiryu (JP); Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/784,217

(22) Filed: Feb. 24, 2004

(65) Prior Publication Data

US 2004/0167696 A1 Aug. 26, 2004

(30) Foreign Application Priority Data

Feb. 26, 2003 (JP) .................................... 2003-049628

(51) Int. Cl.$^7$ .............................................. B60R 21/32
(52) U.S. Cl. ........................................ 701/45; 280/735
(58) Field of Search ............................ 701/45, 46, 47, 701/48; 280/735, 734, 770; 180/274, 282

(56) References Cited

U.S. PATENT DOCUMENTS

| | | | |
|---|---|---|---|
| 6,282,474 B1 * | 8/2001 | Chou et al. | 701/45 |
| 6,542,073 B2 * | 4/2003 | Yeh et al. | 340/440 |
| 6,560,519 B2 * | 5/2003 | Williams et al. | 701/45 |
| 6,594,570 B2 * | 7/2003 | Nagao et al. | 701/45 |

FOREIGN PATENT DOCUMENTS

| | | |
|---|---|---|
| JP | 2001-260780 | 9/2001 |
| JP | A-2001-260780 | 9/2001 |

OTHER PUBLICATIONS

U.S. Appl. No. 10/443,800, filed May 23, 2003, Ide et al.
U.S. Appl. No. 10/443,799, filed May 23, 2003, Ide et al.
U.S. Appl. No. 10/614,902, filed Jul. 9, 2003, Ogata et al.

* cited by examiner

*Primary Examiner*—Richard M. Camby
(74) *Attorney, Agent, or Firm*—Posz & Bethards, PLC

(57) ABSTRACT

An activating apparatus for vehicle passenger protection devices includes a rollover determining section for determining the likelihood of a vehicle rollover. When only the presence of a passenger on the driver' seat is detected by an occupant sensor, a determination control change-over section changes conditions for rollover likelihood determination that are used for the determination of activation of a passenger protection device on a navigator's seat side to conditions that make it difficult to render a decision that a vehicle rollover is imminent. With this arrangement, the navigator's seat side passenger protection device is activated with a time delay after activation of a passenger protection device on the driver's seat side.

6 Claims, 3 Drawing Sheets

ACTIVATING APPARATUS FOR VEHICLE PASSENGER PROTECTION DEVICES

BACKGROUND OF THE INVENTION

1. Field of the Invention

The present invention relates to an activating apparatus for vehicle passenger protection devices.

2. Description of the Related Art

Various methods for determining likelihood of rollover of a vehicle have been proposed, as disclosed in, for example, Japanese Patent Laid-open Publication (JP-A1) No. 2001-260780. According to the disclosed vehicle rollover likelihood determining method, a threshold line is set on a two-dimensional map drawn with the roll angle and roll angular rate of a vehicle as parameters, and the likelihood of a vehicle rollover is determined based on whether or not a hysteresis line of the actual roll angle and roll angular rate of the vehicle crosses the threshold line from a non-rollover area to a rollover area. The result of the vehicle rollover likelihood determination is used for deployment control of a curtain airbag module or a side airbag module.

In the disclosed vehicle rollover likelihood determining method, particular note is taken of the fact that when the lateral slip speed is high, the so-called "trip-over" type rollover is likely to occur; the threshold line is moved to approach the original point of the two-dimensional map as the lateral slip speed of the vehicle increases, thereby enabling early determination of likelihood of a vehicle rollover.

Even in case of the "trip-over" type rollover, however, if there is no occupant present on the navigator's seat, it is desirable for a curtain airbag module or the like protection device on the navigator's seat side to be deployed not at the same time as deployment of a curtain airbag module on the driver's seat side, but at the time the roll angle of the vehicle becomes large to some extent because a delayed deployment of the navigator's seat side curtain airbag module can effectively protect the driver from crashing through a window of the navigator's seat side. This means that the known vehicle rollover likelihood determination method discussed above cannot activate passenger protection devices, such as curtain airbag modules or side airbag modules, in the vehicle at the right time.

SUMMARY OF THE INVENTION

It is accordingly, an object of the present invention to provide an activation apparatus for passenger protection devices in a vehicle, which is capable of activating the passenger protection devices at the right time in accordance with the position of occupants in the vehicle.

To achieve the foregoing object, according to the present invention, there is provided an activating apparatus for passenger protection devices in a vehicle, comprising: a roll condition detecting means for detecting a roll condition of the vehicle; activation determining means for, on the basis of the roll condition detected by the roll condition detecting means, determining likelihood of a vehicle rollover, and on the basis of a result of the determination, performing determination on the activation of a passenger protection device on a driver's seat side and a passenger protection device on a navigator's seat side of the vehicle; occupant detecting means for detecting an occupant in the vehicle; and determination condition changing means incorporated in the activation determining means for, when only the presence of an occupant on a driver's seat has been detected by the occupant detecting means, changing determination conditions relating to the vehicle rollover that are used for the determination of activation of the passenger protection device on the navigator's seat side, into conditions that make it difficult for the activation determining means to render a decision that a vehicle rollover is imminent.

With the activation apparatus thus arranged, when the navigator's seat is not occupied by a passenger, the vehicle rollover-related determination conditions are changed to conditions that make it difficult to render a decision that a vehicle rollover is imminent, so that the passenger protection device on the navigator's seat side is activated after activation of the passenger protection device on the driver's seat side.

In one preferred form of the invention, the roll condition detecting means comprises roll angular rate detecting means for detecting a roll angular rate of the vehicle, and roll angle detecting means for detecting a roll angle of the vehicle or roll angle calculating means for calculating by integration a roll angle of the vehicle from the roll angular rate detected by the roll angular rate detecting means, and the determination condition changing means, when the presence of an occupant on the driver's seat and the presence of an occupant on the navigator's seat have been detected by the occupant detecting means, allows the activation determining means to perform determination of the likelihood of a vehicle rollover based on the roll angle and the roll angular rate, and when only the presence of an occupant on the driver's seat has been detected by the occupant detecting means, allows the activation determining means to perform determination of the likelihood of a vehicle rollover based solely on the roll angle.

According to the vehicle rollover likelihood determination based on the roll angle and the roll angular rate, it is possible to estimate a feature roll angle from the current roll angular rate of the vehicle. On the other hand, the vehicle rollover likelihood determination based solely on the roll angle cannot infer a feature roll angle from the current roll angle. Thus, the first-mentioned rollover likelihood determination can render or provide, at early stages of a rollover event, a decision that such vehicle rollover is imminent. In the case of the second-mentioned rollover likelihood determination, however, the same decision can be provided at a later time than that of the first-mentioned rollover likelihood determination.

Thus, as compared with a mode of activation effected simultaneously with the activation of the passenger protection device on the driver's seat side, the passenger protection device on the navigator's seat side is activated at the right time (namely, with a time delay) in view of the position of an occupant in the vehicle.

In another preferred form of the present invention, the roll condition detecting means comprises roll angular rate detecting means for detecting a roll angular rate of the vehicle, and roll angle detecting means for detecting a roll angle of the vehicle or roll angle calculating means for calculating by integration a roll angle of the vehicle from the roll angular rate detected by the roll angular rate detecting means, and the activation determining means comprises rollover determining means having a two-dimensional map with roll angle and roll angular rate of the vehicle as parameters, the two-dimensional map having a boundary line set to separate a rollover region in which a vehicle rollover can occur and a non-rollover region in which the vehicle rollover cannot occur, and the rollover determining means performs determination of the likelihood of a vehicle rollover by putting a value of the roll angle and a value of the roll angular rate into the two-dimensional map.

By virtue of the boundary line set on the two-dimensional map to separate the rollover region and the non-rollover region, the likelihood of a vehicle rollover can readily be determined by a region in which the respective values of the roll angle and the roll angular rate belong.

Preferably, the determination condition changing means sets a second boundary line with a larger threshold value than the first-mentioned boundary line onto the two-dimensional map that is determined by shifting the first-mentioned boundary line in a direction to mitigate the likelihood of a vehicle rollover.

By thus shifting the boundary line to set a higher threshold second boundary line when no passenger is present on the navigator's seat, activation of the passenger protection device on the navigator's seat side is deferred until both the roll angle and the roll angular rate of the vehicle become large or increase to some extent. With this delayed activation, the passenger protection device on the navigator's seat side is activated at an appropriate time to the occasion where no passenger is present on the navigator's seat.

In still another preferred form of the present invention, the activation determining means further comprises variation calculating means for calculating a variation in roll angular rate with time, and the activation determining means performs determination of activation of the protection device on the driver's seat side based on the variation in roll angular rate calculated by the variation calculating means and a result of the determination performed by the rollover determining means.

In a particular form of rollover where the roll angular rate is high at early stages of a rollover event, a variation in roll angular rate with time becomes large. Accordingly, if the passenger protection device on the driver's seat side is activated when a large roll angular rate variation occurs, this will achieve activation of the driver's seat side passenger protection device at early stages of rollover event. For the passenger protection device on the navigator's seat side, activation determination using the roll angular rate variation is not effected with the result that early activation of the navigator's seat side passenger protection device does not occur.

DETAILED DESCRIPTION OF THE PREFERRED EMBODIMENT

Figure 1:
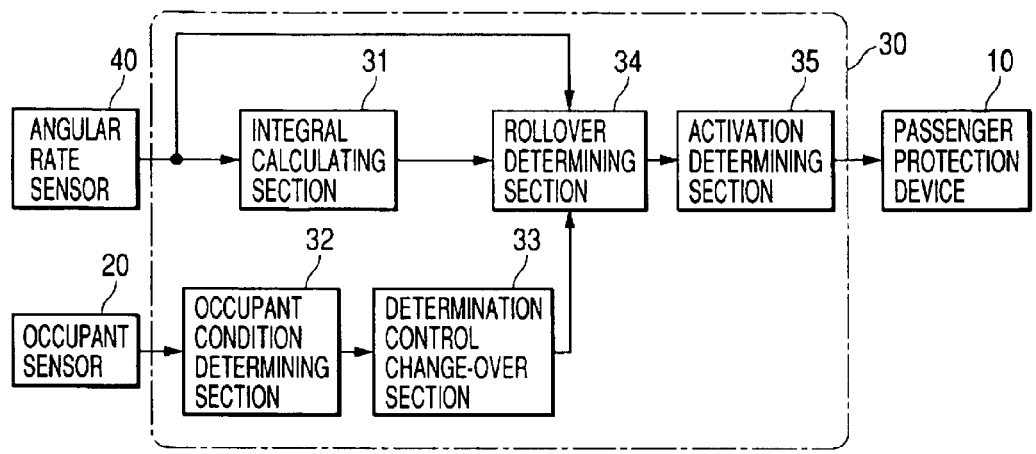
FIG. 1 is a block diagram showing the general functional arrangement of an activating apparatus for vehicle passenger protection devices according to an embodiment of the present invention.

One preferred structural embodiment of the present invention will be described in detail herein below, by way of example only, with the reference to the accompanying drawings, in which identical or corresponding parts are denoted by the same reference characters throughout views.

FIG. 1 shows in block diagram an activating apparatus for a vehicle passenger protection device according to an embodiment of the present invention. As shown in this figure, the activating apparatus generally comprises an occupant detecting means or sensor 20, a control unit 30, and an angular rate sensor 40. The control unit 30 is connected to a passenger protection device 10.

The passenger protection device 10 comprises a seat belt pretensioner (not shown) operative to remove a slack in a seat belt system, and a shock absorbing airbag module (not shown) inflatable to spread between the head, chest or lumber of a passenger and the interior of a passenger compartment of the vehicle. The passenger protection device 10 is provided on both a driver's seat side and a navigator's seat side of the vehicle and caused to operate when it receives an activation command from the control unit 30.

The occupant sensor 20 is a sensor provided on each seat of the vehicle for detecting the presence of a passenger or occupant setting on the respective seat. In one preferred form, the occupant sensor 20 is formed by a load sensor disposed between a leg portion and a seat cushion of the seat, or a pressure sensor embedded in a seat cushion of the seat. A detection signal from the occupant sensor 20 is outputted or supplied to the control unit 30.

The angular rate sensor 40 is a sensor for detecting an angular velocity or rate about a longitudinal axis of the vehicle (i.e., a roll angular rate RR) and may include an acceleration sensor for detecting a force generated in a given mass according to rotation, a vibrating structure gyro, a gas rate gyro and the like. A detection signal from the angular rate sensor 40 is supplied to the control unit 30.

The control unit 30 is composed of an integral calculating section 31, an occupant condition determining section 32, a determination control change-over section 33, a rollover determining section 34 and an activation determining section 35. The integral calculating section 31 performs an integration process on a roll angular rate RR from the angular rate sensor 40 to thereby calculate a roll angle RA of the vehicle about the longitudinal axis thereof. For instance, the integration process is achieved by using the following formula:

$$RA = \int RR \cdot dt(t[t-1]-t[t])$$

The occupant condition determining section 32 receives the detection signal from the seat occupancy detection sensor 20 and determines whether a passenger or occupant is present on each seat or not. The result of determination is outputted to the determination control change-over section 33.

The determination control change-over section 33 receives the determination result from the occupant condition determining section 32 and, when the determination result shows that only the presence of an occupant on the driver's seat is detected, it outputs a signal to change of the setting of a boundary line effected on a map that is used in the rollover determining section 34 described below.

Figure 4:
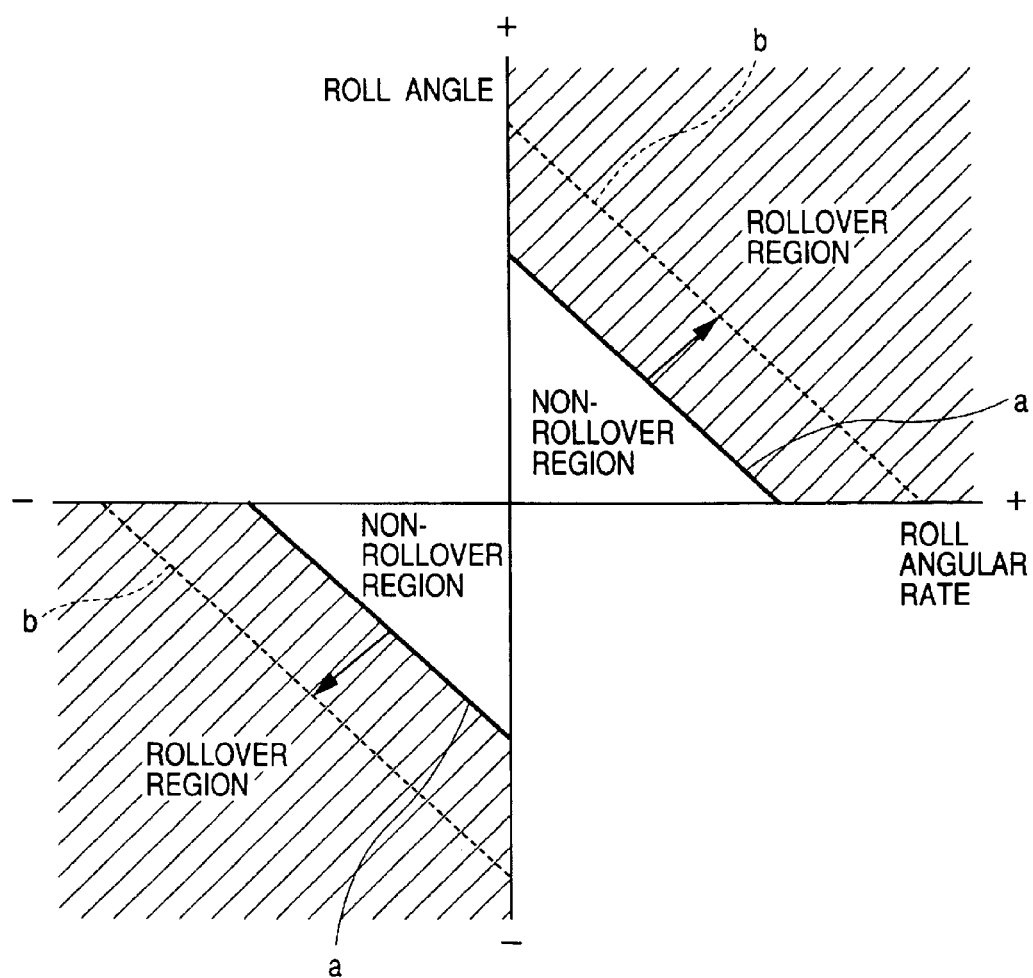
FIG. 4 is a map showing the relationship between the roll angle and the roll angular rate of the vehicle according to the present invention.

The rollover determining section 34 determines the likelihood of a vehicle rollover on the basis of the roll angle RA and roll angular rate RR of the vehicle. The rollover determining section 34, as shown in FIG. 4, has a two-dimensional map stored therein. The map establishes a relation or correspondence between the roll angle RA and the roll angular rate RR as parameters. From a position on the map that is determined by values of the roll angle RA and roll angular rate RR, the rollover determining section 34 determines the likelihood of a vehicle rollover.

More specifically, when the position determined by the RA and RR values is within a non-rollover area or region of the map, it is determined that a vehicle rollover cannot occur. Alternatively, when the position determined by the RA and RR values is within a rollover area or region of the map, it is determined that a vehicle rollover can occur. A boundary line "a" between the non-rollover region and the rollover region varies with the type of vehicles and is determined in advance by experiment, for example.

The activation determining section 35 determines, based on the result of determination performed by the rollover determining section 34, whether or not the passenger protection devices 10 provided on the driver's seat side and the navigator's seat side are to be activated.

In case where the rollover determining section 34 receives from the determination control change-over section 33 an instruction signal to change the setting of the boundary line "a" effected on the map, the rollover determining section 34 performs two determinations: one being a determination based on a setting with the boundary line "a", and the other being a determination based on a setting with a boundary line "b", which is obtained by shifting the boundary line "a" in a direction to suppress or mitigate the likelihood of a vehicle rollover.

At the activation determining section 35, the result of rollover likelihood determination performed on the basis of the setting having the boundary line "a" is used to determine whether to activate or not the passenger protection device 10 provided on the driver's seat side. Likewise, the result of rollover likelihood determination performed at the rollover determining section 23 on the basis of the setting with boundary line "b" is used at the activation determining section 35 for determination of whether or not the passenger protection device 10 on the navigator's seat side is to be activated.

Figure 2:
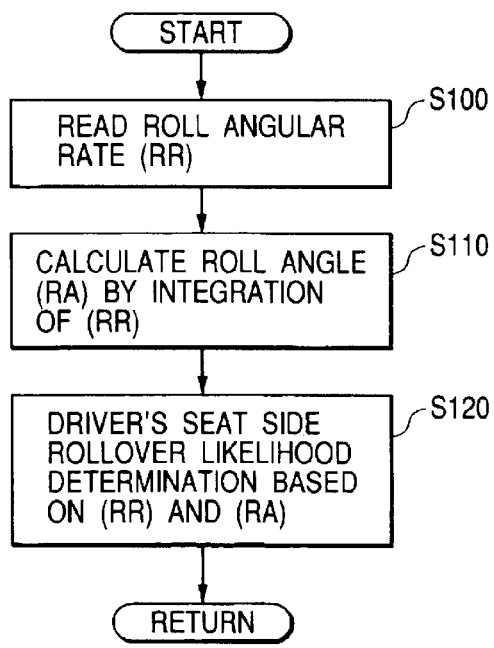
FIG. 2 is a flowchart showing a control procedure achieved by a control unit in the activation apparatus to perform a rollover likelihood determination process for a passenger protection device installed on a driver's seat side of the vehicle.

A process for determining activation of the passenger protection device will be described below with reference to the flowcharts shown in FIGS. 2 and 3. Referring first to the flowchart shown in FIG. 2, there is shown an activation determining process for the passenger protection device 10 provided on the driver's seat side. As shown in FIG. 2, a step S100 reads a roll angular rate RR, and then a step S110 performs integral process on the roll angular rate RR to calculate a roll angle RA.

Subsequently, by using the map with a setting having the boundary line "a" shown in FIG. 4, a step S120 determines the likelihood of a vehicle rollover based on a position on the map that is determined by a value of the roll angular rate RR read-in in step S100 and a value of the roll angle RA calculated in step S110.

Then, based on the result of vehicle rollover likelihood determination performed in step S120, it is determined whether to activate or not the passenger protection device 10 provided on the driver's seat side. For instance, when the vehicle rollover likelihood determination result in step S120 shows that a vehicle rollover will occur or imminent, the passenger protection device 10 on the driver's seat side is determined to be activated.

Figure 3:
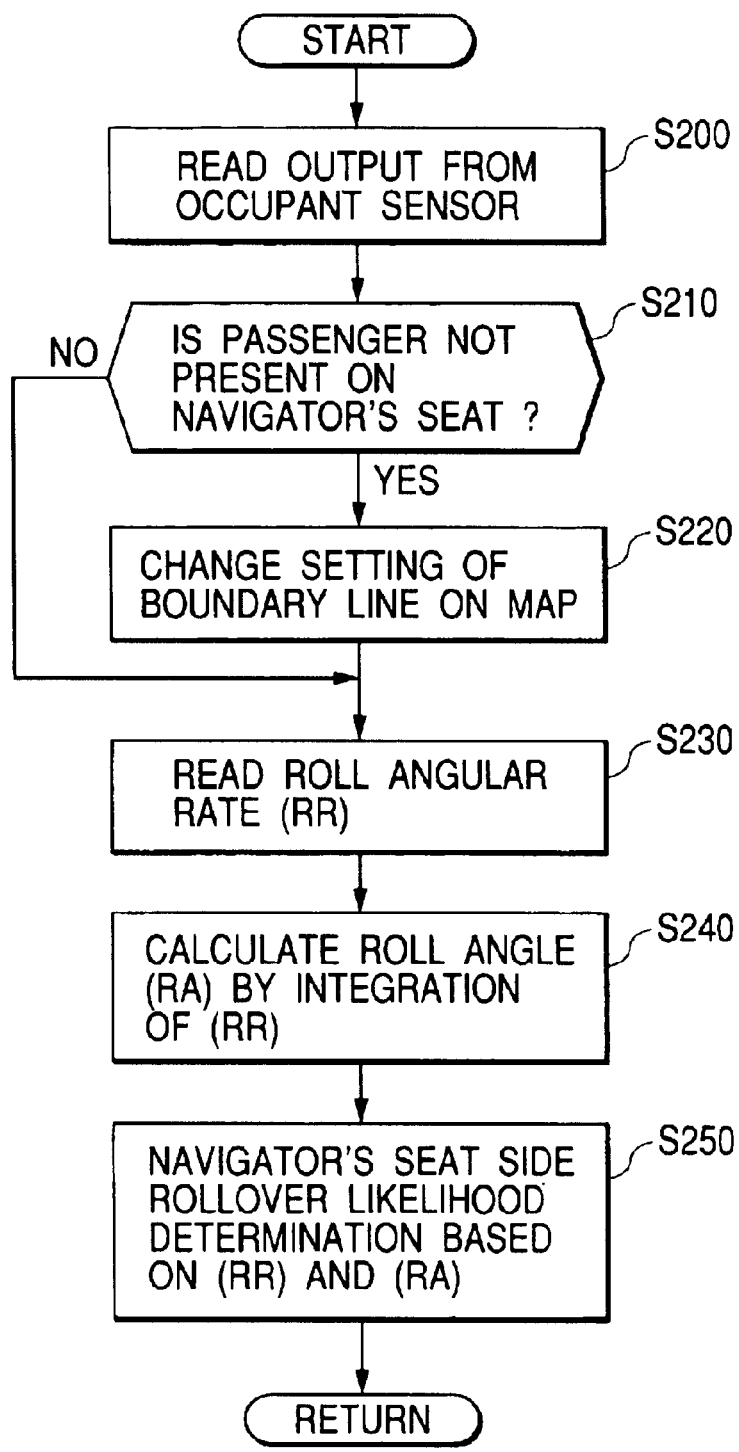
FIG. 3 is a flowchart showing a control procedure achieved by the control unit in the activation apparatus to perform a rollover likelihood determination process for a passenger protection device installed on a navigator's seat side of the vehicle.

Referring next to FIG. 3, there is shown in flowchart an activation determining process for the passenger protection device 10 provided on the navigator's seat side. As shown in FIG. 3, a step S200 reads an output signal (detection signal) from the occupant sensor 20.

Then, a step S210 determines whether or not a passenger is present on the navigator's seat. When the result of determination shows that there is no passenger present on the navigator's seat, the control procedures advances to a step S220. Alternatively, when the determination result shows the presence of a passenger on the navigator's seat, the control procedures jump to a step S230.

In step S220, the boundary line "a" set on the map of FIG. 4 is shifted or changed to a boundary line "b". In step S230, a roll angular rate RR is read in, and in a subsequent step S240, the roll angular rate RR is subjected to an integral process so as to calculate a roll angle RA.

Subsequently, by using the map having a setting with the boundary line "b" shown in FIG. 4, a step S250 determines the likelihood of a vehicle rollover based on a position on the map that is determined by a value of the roll angular rate RR read-in in step S230 and a value of the roll angle RA calculated in step S240. Then, based on the result of vehicle rollover likelihood determination in step S250, it is determined whether to activate or not the passenger protection device 10 provided on the navigator's seat side. For instance, when the result of vehicle rollover likelihood determination in step S250 shows that a vehicle rollover will occur or imminent, the passenger protection device 10 on the navigator's seat side is determined to be activated.

As thus far explained, when a passenger is not present on the navigator seat, the boundary line "a" on the map of FIG. 4 is shifted to the position of the boundary line "b", so that activation of the passenger protection device 10 on the navigator's seat side occurs after activation of the passenger protection device 10 on the driver's seat side.

Thus, in the case where no passenger is present on the navigator's seat, the passenger protection device 10 on the navigator's seat side is activated only when the roll angle RA becomes large to some extent and the roll angular rate becomes high to some extent. Such activation timing (i.e., activation with a time delay) is particularly effective to protect the driver from crashing through a window of the navigator's seat side.

In the embodiment described above, determination of activation is performed with respect to the passenger protection device including the seat belt pretensioner and airbag module associated with each seat. It is possible according to the present invention to achieve such activation determination only for the air bag module provided on the navigator's seat side while skipping activation determination for the seat belt pretensioner provided on each seat. This arrangement ensures that regardless of the position of the passenger, every passenger can be reliably restrained on the seat with the seat belt system from the initial stage of a rollover event.

(First Modification)

Although in the embodiment described above, activation determination processes for the passenger protection devices on the driver's seat side and navigator's seat side involve changing or shifting of the boundary line set on the map shown in FIG. 4, so as to determine the likelihood of a vehicle change over, the present invention can be also practiced without involving shifting the boundary line. In the latter case (or according to a first modification according to the present invention), when the presence of passengers on both the driver's seat and the navigator's seat has been detected, the likelihood of a vehicle rollover is determined based on the roll angle RA and the roll angular rate RR of the vehicle, and alternatively when only the presence of a passenger on the driver's seat has been detected, the vehicle rollover likelihood determination is performed solely on the basis of the roll angle RA.

The vehicle rollover likelihood determination based on the roll angle RA and roll angular rate RR involves estimation for feature values taken by the roll angle RA, whereas the vehicle rollover likelihood determination based on only the roll angle RA cannot infer a feature roll angle RA from the present roll angle RA. For this reason, the first-mentioned determination (based on the roll angle RA and roll angular rate RR) can determine the likelihood of a vehicle rollover at early stages of a roll event, whereas the second-mentioned determination (based solely on the roll angle RA) is slow to determine the likelihood of a vehicle rollover as compared to the first-mentioned determination.

With the foregoing vehicle rollover likelihood determination process, it is possible to activate the passenger protection device 10 on the navigator's seat side at an appropriate time (more particularly, with a time delay) as compared with the occasion where the navigator's seat side passenger protection device is activated at the same time as the passenger protection device 10 on the driver's seat side. Such activation timing ensures that an airbag module incorporated in the passenger protection device 10 on the navigator's seat side is caused to deploy at the right time to protect the driver from crashing through a window on the navigator's seat side.

(Second Modification)

In the illustrated embodiment, activation determination processes for the driver's side passenger protection device 10 involves the use of the two-dimensional map with boundary line "a" shown in FIG. 4, in which values of the roll angle RA and roll angular rate RR are put into the map to determine the likelihood of a vehicle rollover. According to a second modification of the present invention, a difference value D_RR between a previous value and a present value of the roll angular rate RR is compared with a predetermined value Dth, and the result of this comparison and the result of determination using the two-dimensional map of FIG. 4 are used in combination to determine whether the passenger protection device 10 on the driver's seat side is to be activated or not. Stated more specifically, when the difference value D_RR is larger than the predetermined value Dth, it is determined that a vehicle rollover can occur.

In a particular form of rollover where a high roll angular rate is observed at early stages of a rollover event, the difference value D_RR becomes large. This ensures that the driver's seat side passenger protection device 10 can be activated at early stages of such rollover event. For the passenger protection device 10 provided on the navigator's seat side, the foregoing activation determination based on the difference value D_RR is not performed. Thus, activation of the navigator's seat side passenger protection device 10 at early stages of the rollover event does not occur.

The difference value D_RR may used to calculate an estimated value that may be taken by the roll angular rate at a point of time after the lapse of a predetermined time period from the present. The estimated roll angular rate value thus calculated and a value of the roll angle RA are put in the map shown in FIG. 4 so as to determine the likelihood of a vehicle rollover.

Obviously, various minor changes and modifications are possible in the light of the above teaching. It is to be understood that within the scope of the appended claims the present invention may be practiced otherwise than as specifically described.

What is claimed is:

1. An activating apparatus for passenger protection devices in a vehicle, comprising:

a roll condition detecting means for detecting a roll condition of the vehicle;

activation determining means for, on the basis of the roll condition detected by the roll condition detecting means, determining likelihood of a vehicle rollover, and on the basis of a result of the determination, performing determination on the activation of a passenger protection device on a driver's seat side and a passenger protection device on a navigator's seat side of the vehicle;

occupant detecting means for detecting an occupant in the vehicle; and determination condition changing means incorporated in the activation determining means for, when only the presence of an occupant on a driver's seat has been detected by the occupant detecting means, changing determination conditions relating to the vehicle rollover that are used for the determination of activation of the passenger protection device on the navigator's seat side, into conditions that make it difficult for the activation determining means to render a decision that a vehicle rollover is imminent.

2. The activating apparatus according to claim 1, wherein the roll condition detecting means comprises roll angular rate detecting means for detecting a roll angular rate of the vehicle, and roll angle detecting means for detecting a roll angle of the vehicle or roll angle calculating means for calculating by integration a roll angle of the vehicle from the roll angular rate detected by the roll angular rate detecting means, and the determination condition changing means, when the presence of an occupant on the driver's seat and the presence of an occupant on the navigator's seat have been detected by the occupant detecting means, allows the activation determining means to perform determination of the likelihood of a vehicle rollover based on the roll angle and the roll angular rate, and when only the presence of an occupant on the driver's seat has been detected by the occupant detecting means, allows the activation determining means to perform determination of the likelihood of a vehicle rollover based solely on the roll angle.

3. The activating apparatus according to claim 1, wherein the roll condition detecting means comprises roll angular rate detecting means for detecting a roll angular rate of the vehicle, and roll angle detecting means for detecting a roll angle of the vehicle or roll angle calculating means for calculating by integration a roll angle of the vehicle from the roll angular rate detected by the roll angular rate detecting means, and the activation determining means comprises rollover determining means having a two-dimensional map with roll angle and roll angular rate of the vehicle as parameters, the two-dimensional map having a boundary line set to separate a rollover region in which a vehicle rollover can occur and a non-rollover region in which the vehicle rollover cannot occur, and the rollover determining means performs determination of the likelihood of a vehicle rollover by putting a value of the roll angle and a value of the roll angular rate into the two-dimensional map.

4. The activating apparatus according to claim 3, wherein the determination condition changing means sets a second boundary line with a larger threshold value than the first-mentioned boundary line onto the two-dimensional map that is determined by shifting the first-mentioned boundary line in a direction to mitigate the likelihood of a vehicle rollover.

5. The activating apparatus according to claim 3, wherein the activation determining means further comprises variation calculating means for calculating a variation in roll angular rate with time, and the activation determining means performs determination of activation of the protection device on the driver's seat side based on the variation in roll angular rate calculated by the variation calculating means and a result of the determination performed by the rollover determining means.

6. The activating apparatus according to claim 4, wherein the activation determining means further comprises variation calculating means for calculating a variation of the roll angular rate with the time past, and the activation determining means performs determination of activation of the protection device on the driver's seat side based on the variation of the roll angular rate calculated by the variation calculating means and a result of the determination performed by the rollover determining means.

* * * * *